May 24, 1955  B. N. TORELL  2,708,826
FUEL CONTROL FOR GAS TURBINE
Filed March 30, 1949  2 Sheets-Sheet 1
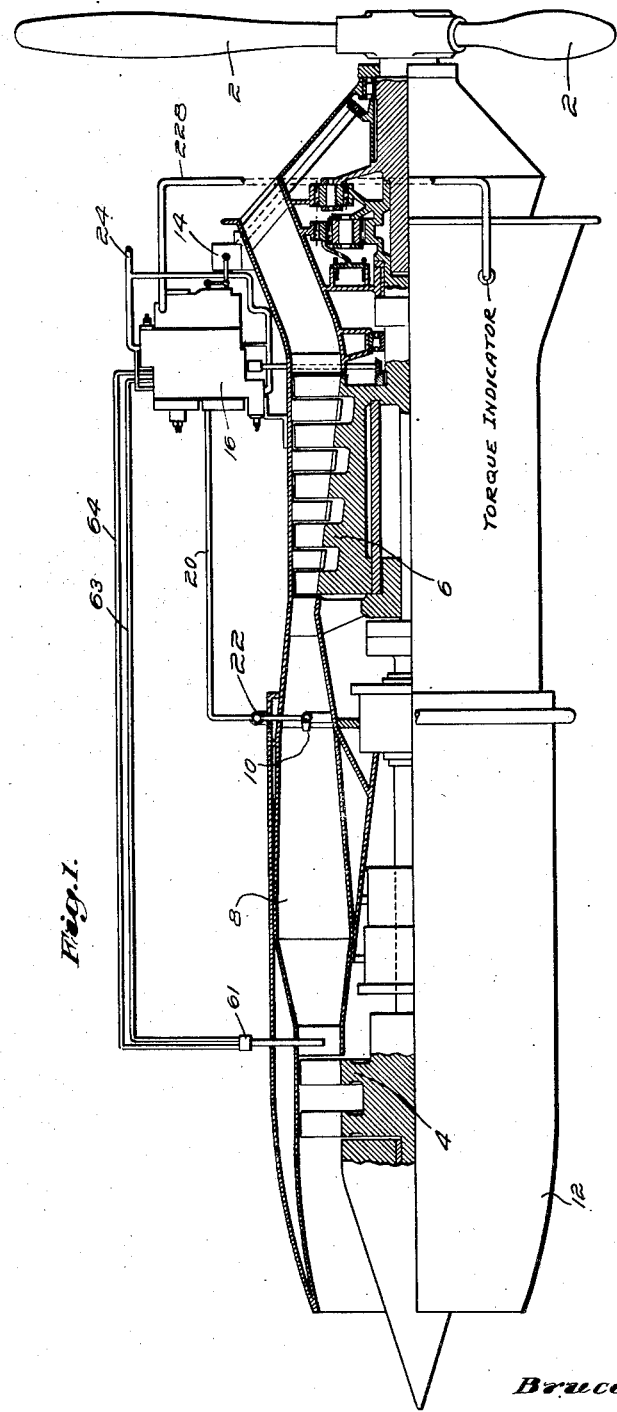
INVENTOR.
Bruce N. Torell
BY Charles A. Warren
Attorney

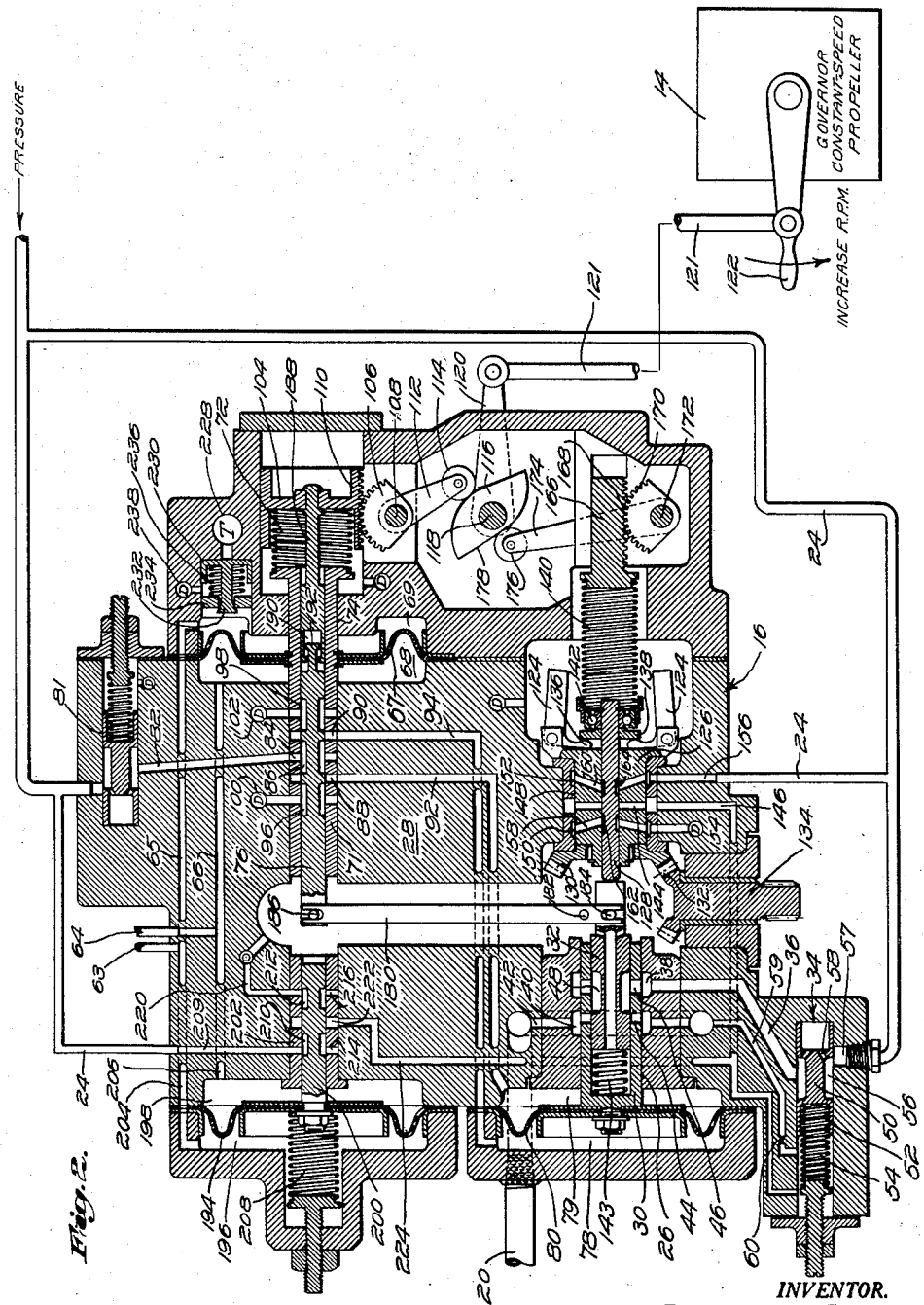

United States Patent Office 2,708,826
Patented May 24, 1955

2,708,826
FUEL CONTROL FOR GAS TURBINE

Bruce N. Torell, Wethersfield, Conn., assignor to United Aircraft Corporation, East Hartford, Conn., a corporation of Delaware Application March 30, 1949, Serial No. 84,303

13 Claims. (Cl. 60—39.28)

This invention relates to a fuel control device for a gas turbine power plant, and for the purpose of this specification the control is illustrated in connection with a propeller-turbine such as used in aircraft.

Studies of gas turbine power plants have indicated that a control which varies fuel flow only as a function of the difference between the temperature of the gas stream and a fixed selected temperature when used in conjunction with a governor controlling speed through some other power plant variable, i. e. propeller pitch, tail cone area, etc., would tend to cause instability in the control of temperature and speed, and it appears desirable not to attempt to maintain a fixed selected gas stream temperature during transients. It is the purpose of the fuel control described herein to operate the power plant at the manually selected temperature only when power plant speed is at the selected value and acceleration is zero, and at all other times to depart from this limitation in order to control fuel in a way conducive to stable operation and to provide maximum allowable temperature during acceleration and minimum allowable temperature during deceleration.

A feature of the invention is a fuel control which will vary the rate of change of fuel flow with time as the sum of functions of two variables. It is desirable that the functional relationship between change of fuel flow per unit time and each of the two variables be linear, although in practice this is not always possible. The first variable is gas stream temperature error; that is, the difference at any time between the temperature selected by the fuel control and the actual gas stream temperature, the selected temperature being biased from its equilibrium value as a function of power plant speed error within the desired limits of maximum and minimum actual temperature. The second variable is either the rate of change of power plant speed error with time, or else is the rate of change of power plant speed with time.

In using a gas turbine power plant to drive a propeller, a governor may be used for maintaining the rotational speed of the power plant at a selected value by controlling the pitch of the propeller blades. A feature of the present invention is an interconnection between the fuel control device and the speed governor for maintaining a selected gas stream temperature and speed throughout the effective range of the power plant.

The power developed by a gas turbine power plant is a function of the temperature of the exhaust gases and, since the turbine parts can withstand only a certain maximum temperature, one of the features of this invention is an arrangement of the fuel control device to allow selection and stable maintenance of any desired turbine gas stream temperature up to the maximum temperature limit under all operating conditions.

In the event of a requirement for increased power involving an increase of power plant rotational speed, maximum torque during the acceleration period is desirable. A feature of the invention is to provide maximum torque during acceleration by allowing the turbine gas stream temperature to increase to its maximum limit for the acceleration period. Another feature is to provide minimum torque when decreased power is required by allowing the turbine gas stream temperature to decrease to its minimum limit during the deceleration period.

A feature of the invention is an arrangement for preventing power plant speed from falling below a predetermined minimum value in the speed range in which the speed governor does not regulate.

One feature of the invention is an arrangement of the fuel control device so that it may function as an overspeed governor by reducing fuel flow when power plant speed exceeds its maximum limit. Another feature of the invention is an arrangement to provide for rapid limitation of the permissible maximum and minimum turbine gas stream temperatures.

One feature of the invention is an arrangement of the device to provide for limiting the maximum torque developed by the turbine shaft by reducing the maximum temperature value when the maximum torque value has been exceeded.

Other features and advantages will be apparent from the specification and claims and from the accompanying drawings which illustrate an embodiment of the invention.

In the drawings:

Fig. 1 is a diagrammatic view of the power plant.

Fig. 2 is a diagrammatic view of the fuel control for the power plant.

As stated hereinbefore, the present invention is intended to vary the rate of change of fuel flow with time as the sum of functions of two variables: (1) a function of turbine gas stream temperature error and (2) a function of the rate of change of power plant speed error with time, or a function of the rate of change of power plant speed with time.

Expressed mathematically:

$$\frac{\Delta WF}{\Delta t} = KA + K'B$$

where:

$\Delta WF$ = increment of fuel flow
$\Delta t$ = increment of time
$K$ and $K'$ = proportionality constants
$A$ = turbine gas stream temperature error
$B$ = rate of change of power plant speed error with time or rate of change of powerplant speed with time To develop this further:

$$A = T_{sel} - T_{act}$$

where:

$T_{sel}$ = turbine gas stream temperature selected by the fuel control
$T_{act}$ = actual turbine gas stream temperature But the turbine gas stream temperature selected by the fuel control is biased from its equilibrium value as a function of power plant speed error so that:

$$T_{sel} = T_{equilib} - K''(N_{sel} - N_{act})$$

where:

$T_{equilib}$ = gas stream temperature selected by the fuel control without bias.
$K''$ = proportionality constant.
$N_{sel}$ = power plant speed selected by speed governor.
$N_{act}$ = actual power plant speed.
$(N_{sel} - N_{act})$ = power plant speed error.

Thus:

$$A = [T_{equilib} - K''(N_{sel} - N_{act})] - T_{act}$$

Also:

$$B = \frac{\Delta N_{act}}{\Delta t} \text{ or } \frac{\Delta(N_{sel} - N_{act})}{\Delta t}$$

where:

$\Delta N_{act}$ = increment of power plant speed.
$\Delta(N_{sel} - N_{act})$ = increment of power plant speed error.

Therefore:

$$\frac{\Delta WF}{\Delta t} = K([T_{equilib} - K''(N_{sel} - N_{act})] - T_{act}) + K' \frac{\Delta N_{act}}{\Delta t}$$

And the alternative expression is:

$$\frac{\Delta WF}{\Delta t} = K([T_{equilib} - K''(N_{sel} - N_{act})] - T_{act}) + K' \frac{\Delta(N_{sel} - N_{act})}{\Delta t}$$

With reference first to Fig. 1, the power plant includes a propeller 2 driven by a turbine 4 which also drives the compressor 6. The latter supplies air under pressure to one or more combustion chambers 8 through which the air passes to the turbine and in which fuel from the nozzles 10 is burned for adding energy to the gases. Thrust nozzle 12 may be provided on the discharge side of the turbine. The turbine has its speed controlled by a governor 14 which adjusts the pitch of the propeller blades so as to maintain speed constant. Such arrangements are well-known, one arrangement, being described in Patent No. 2,343,382, issued March 7, 1944, to E. Martin for a Propeller Governor. The fuel control device 16 controls the supply of fuel being delivered through outlet conduit 20 to ring manifold 22 which distributes the fuel to nozzles 10. As will hereinafter appear, the governor is interconnected with the fuel control for maintaining the desired schedule of equilibrium turbine gas stream temperature and speed.

With reference now to Fig. 2, fuel under pressure enters the control device through inlet conduit 24 and is discharged through outlet conduit 20 to manifold 22. The fuel to the manifold is metered by a metering valve assembly within bore 26 in casing 28, the latter being the casing for the entire device. The valve assembly includes sleeve 30 and metering piston 32 within the sleeve. Fuel from the inlet conduit 24 passes through pressure regulating valve 34, at the lower left corner of the control, through passage 36 to an annular groove 38 surrounding the sleeve 30, and through a port in the sleeve to a groove in metering piston 32 from where it passes through another port in the sleeve 30 to annular groove 40 communicating with passage 42 in the casing. The passage 42 communicates with the outlet conduit 20 as will be apparent.

The sleeve 30 has axially spaced ports 44 and 46 which align with the grooves 38 and 40 and which are normally interconnected by groove 48 in the metering piston 32. With the parts in the position shown, it will be apparent that movement of the piston 32 to the left, or of the sleeve 30 to the right, increases the flow of fuel to the outlet conduit 20.

The pressure regulating valve 34 includes piston 50 sliding in bore 52 and normally urged by spring 54 into a position to connect groove 56 in the piston with inlet port 57 connecting with inlet conduit 24. The pressure of fuel in the groove 56 is transmitted to the right-hand end of the piston through ports 58, this pressure representing the inlet pressure to the metering valve. The discharge pressure of the metering valve (metered fuel pressure) is admitted by conduit 59 from the passage 42 to the bore 52 at the left-hand end of the piston 50. A restriction 60 may be provided in this passage to alter the pressure on the left-hand end of the piston should fluid be allowed to enter or leave through passage 146. With this arrangement, it will be apparent that the pressure drop across the metering valve is maintained constant regardless of the flow through the valve since, if the pressure in the passage 42 decreases, the area of the inlet port 57 is reduced due to movement of the piston 50 to the left, which in turn decreases the pressure in passage 36 at the inlet to the valve. If the pressure in the passage 42 increases, piston 50 would move to the right enlarging the area of inlet port 57 and thus increasing the pressure in passage 36.

As stated before, the fuel supply to the power plant is regulated as a function of the gas stream temperature error. It is common practice in the gas turbine power plant field to use turbine inlet temperature as an indication of gas stream temperature, although other stations along the exhaust stream path can be used. A device for indicating turbine inlet temperature is shown at 61 in Fig. 1. This device may be any one of several types of temperature sensing devices although in the arrangement shown, it is of a type which indicates temperature by pressure differential and a change in the temperature by a change in pressure differential between two existing pressures. A device of this type is shown, for example, in Patent No. 1,630,307, issued May 31, 1927, to H. Y. Norwood and K. L. Tate for Apparatus For Measuring and Indicating the Flow of Gases or in Patent No. 1,630,318, issued May 31, 1927, to K. L. Tate for Apparatus for Measuring the Flow of Gases.

It is sufficient for the purpose of this invention to state that the pressure differential results from temperature sensing device 61, the pressures being transmitted through conduits 63 and 64 to fuel control 16 and then by passages 65 and 66 to chambers 68 and 69 on the opposite sides of diaphragm 67 located in casing 28. Diaphragm 67 carries sleeve 71 and is biased toward the left by spring 72. The sleeve 71 slides in bore 74 and in turn receives pilot valve 76 which, at the moment, can be considered as stationary. The sleeve controls the admission of fluid under pressure to chambers 78 and 79 on opposite sides of diaphragm 80 to which is connected the sleeve 30 of the fuel regulating valve.

Fuel from a branch of inlet conduit 24 passes through pressure regulating valve 81 into passage 82 and is admitted through port 84 in the sleeve 71 to groove 86 in the pilot valve 76. The groove is of such dimensions as to admit fluid under pressure alternately to spaced ports 88 or 90 in the sleeve 71, these ports aligning respectively with passages 92 and 94 in the casing. The passage 94 communicates with the left-hand chamber 78 with respect to diaphragm 80 and the other passage 92 communicates with the right-hand chamber 79 in such a manner that movement of the sleeve 71 to the left, resulting from a decrease in the turbine inlet temperature, will cause a movement of the diaphragm 80 and the attached sleeve 30 to the right, the rate of which is proportional to the displacement of the sleeve 71 with respect to the pilot valve 76. This increases the flow of fuel through the metering valve tending to restore the selected temperature at the turbine inlet. When either port 88 or 90 is communicated with the fuel under pressure, the opposite port is connected as by grooves 96 and 98 in the pilot valve 76 to drain ports 100 and 102. Thus, the rate of motion of the sleeve 30 for adjusting the fuel flow is a direct function of the deviation from the selected temperature.

The selected turbine inlet temperature may be changed by adjusting the position of sliding abutment 104 with which the end of the spring 72 engages. This abutment may be shifted axially through gear segment 106 pivotally mounted as on pin 108 and engaging with rack 110 on the abutment. The gear segment 106 carries arm 112 having follower 114 engaging with and moved by cam 116. The position of the cam, which is pivoted as on pin 118, is changed by arm 120 connected by link 121 to the pilot's selector lever 122. By properly contouring this cam, any desired relation between the turbine inlet temperature selected as previously described and power plant speed as selected by the lever 122 through governor 14 may be obtained.

The fuel flow is also adjusted as a function of the variation in power plant speed from the selected speed and a speed sensing device, such as a centrifugal governor, is used to accomplish this. The device includes fly weights 124 carried by rotating sleeve 126 functioning to slide pilot valve 128 axially within said sleeve. The sleeve also carries bevel gear 130 meshing with cooperating gear 132 on a shaft 134 which is connected to and driven by the turbine rotor through shaft 135 (Fig. 1.) The camming surfaces 136 on the fly weights engage with flange 138 on the pilot valve 128 to move the valve within the sleeve 126 against the action of spring 140 which engages with the flange 138 through the medium of bearing 142.

Compression of the spring 140 is accomplished by movement of the abutment 166 through rotation of the gear segment 170 on arm 174. The cam surface 178 is so contoured that the position of the pilot valve 128, as brought about by a force balance between the fly weights 124 and the spring 140, will always be the same regardless of what rotational speed has been selected through the pilot's selector lever 122 linked with the governor 14 as long as the actual power plant speed is equal to the selected speed.

Should an error in speed exist, whether due to a change of power plant speed from that selected or a change of speed selection through movement of the pilot's lever 122, a displacement of the pilot valve 128 from its equilibrium position, as described above, proportional to the error in speed, will be established.

The left-hand end of the pilot valve 128 engages with the end of the metering piston 32 and movement of the valve 128 to the right, under the influence of the fly weights 124 moving radially outward beyond the equilibrium operating position as a result of the establishment of a speed error due to an increase in power plant speed or decrease in power plant speed selection will permit the piston 32 to move to the right under the action of spring 143 thereby causing a proportional reduction of fuel flow through the metering valve. Similarly, movement of the fly weights inwardly beyond the equilibrium operating position resulting from the establishment of a speed error due to a reduction in power plant speed or increase in power plant speed selection allows the valve 128 to move to the left carrying with it the metering piston 32 and causing a proportional increase of fuel flow. Thus, a rate of change of fuel flow is established which is proportional to the rate of change of power plant speed error.

The pilot valve 128 may also be used for limiting the maximum and minimum power plant speeds by admitting fluid under pressure or draining fluid from the left-hand end of the pressure regulating valve 34 thereby changing the quantity of fuel delivered to the power plant. To accomplish this, the sleeve 126 has a centrally located transverse passage 144 communicating through passage 146 in the casing with bore 52 in which the pressure regulating valve 34 is located. Bore 148 in which the sleeve 126 is journalled has axially spaced annular grooves 150 and 152 connecting respectively with drain passage 154 and fluid pressure passage 156 in the casing. The grooves 150 and 152 are connected by passages 158 and 160 respectively in the sleeve 126 with grooves 162 and 164 in the valve 128, these grooves being so connected as normally to cut off the fluid connection with the passage 144 in the sleeve. Upon movement of pilot valve 128 to the right as the fly weights 124 are moved outwardly by an increase in power plant speed beyond the established maximum, the passage 144 is connected with drain passage 158 thereby reducing the pressure of fluid at the left-hand end of the pressure regulating valve 34 causing it to move to the left for throttling the flow of fuel to the power plant.

Similarly, a slowing down of the power plant beyond an established minimum which allows the fly weights to move inwardly beyond the normal operating range connects the fluid pressure passage 160 with passage 144 and increases the pressure acting on the left-hand end of the pressure regulating valve 34, thereby moving it to the right to increase the supply of fuel to the power plant. It will be understood that the spacing of the grooves 162 and 164 is so selected that the fluid connection will not be established to the passage 144 until the power plant reaches the established maximum or minimum speed limit. The normal speed for the power plant may be varied by adjusting the tension of spring 140 as by moving abutment 166 with which one end of the spring 140 engages. This abutment may have rack 168 engageable by gear segment 170 mounted on pin 172. The gear segment may carry arm 174 having follower 176 engaging with cam surface 178 on the same cam 116 which adjusts the operating temperature for the turbine.

The control device may be arranged to bias the selected temperature from its equilibrium value as a function of power plant speed error within the desired limits of maximum and minimum actual temperature as stated before. To this end the device includes lever 180 pivoted as by fixed pin 182 and engaging, at one end, pin 184 on the metering piston 32. The other end of the lever engages with pin 186 on the pilot valve 76 of the temperature control valve. Thus, shifting of the position of the metering piston 32 as caused by a speed error will thereby change the location of the equilibrium point of the pilot valve 76 with respect to the sleeve 71. This arrangement adjusts the temperature selection as a function of speed error as will be apparent. The upper and lower limits of temperature which may be selected either through bias by the speed error or through adjustment of the sliding abutment 104 may be set by interconnecting link 188 between the abutment 104 and the end of the pilot valve 76. The end of the link 188 has a lost motion connection with the pilot valve 76 as by means of slot 190 in the link which receives head 192 on the pilot valve 76 and limits movement of the head to travel between opposite ends of the slot. This establishes the maximum and minimum compression of the spring 72 which can exist with the pilot valve 76 in equilibrium with its sleeve 71 and consequently establishes corresponding limits of selected temperature.

In addition to the maximum and minimum selected temperature limitations applied to the control as above described, additional means are provided so that when the pressure differential indicated by the temperature responsive device reaches a desired maximum or minimum, the metering valve will be adjusted in a manner similar to that described in connection with the governor control. To this end, diaphragm 194, having chambers 196 and 198 on opposite sides thereof, carries piston 200 slidable in sleeve 202. The pressures indicated by the device 61 are directed to opposite sides of diaphragm 194 as through passages 204 and 206 thereby tending to shift the piston 200 to the left within its sleeve. The pressure differential is resisted by spring 208 tending to shift the diaphragm to the right. The piston 200 has spaced grooves 210 and 212 communicating with ports 214 and 216 in the sleeve 202 connected respectively with pressure passage 209 and drain passage 220. The grooves 210 and 212 are spaced apart in such a manner that fluid connection between either port 214 or 216 and a centrally located port 222 in the sleeve normally is cut off. The port 222 is connected as by passage 224 in the casing to the bore 52 at the left-hand end of the pressure regulating valve 34. When the temperature decreases to the desired minimum, thereby decreasing the pressure differential across the diaphragm 194, piston 200 is moved to the right sufficiently to allow fluid under pressure to enter passage 224 thereby moving piston 50 to the right and increasing the flow of fuel to the power plant. Similarly when the temperature increases to the desired maximum, thereby increasing the pressure differential across the diaphragm, the piston 200 is moved to the left sufficiently to connect passage 224 with drain passage 220 and to permit piston 50 to move to the left and reduce the supply of fuel to the power plant.

The control also incorporates a device for limiting the torque developed by the turbine shaft. The shaft torque may be indicated by a suitable torque measuring device located in the propeller reduction gearing section. A device of this type is shown in Patent No. 2,444,363, issued June 29, 1948 to P. Newcomb for a Helical Spline Torque Indicator. Torque developed is reflected in the torque measuring device shown in Fig. 1, which pressure is transmitted through conduit 228 to one side of piston 230 of which valve 232 is an integral part. Valve 232 cooperates with seat 234 in casing 28. The valve is held closed by a spring 236 which tends to push piston 230 to the right. When the torque pressure in conduit 228 has exceeded this spring force, piston 230 is pushed to the left raising valve 232 from its seat and opening chamber 69 to vent 238, thus reducing the pressure in the chamber and in effect selecting a lower temperature since sleeve 71 will move to the right admitting pressure fuel to passage 92, which in turn will cause diaphragm 80 and sleeve 30 to move to the left reducing the fuel supply to the power plant and thus reduce the turbine inlet temperature and power plant speed when the maximum shaft torque has been exceeded.

While there has been illustrated and described a particular mechanical embodiment, it is obvious that this fuel control may be employed with a jet turbine such as used in aircraft which uses a variable area tail cone to regulate power plant speed. In this instance the fuel control is connected with the device for controlling the speed through variation of the tail cone area, rather than with the governor for controlling speed as described hereinbefore. Also, it is apparent that other modifications and changes can be made without departing from the scope of this novel concept.

I claim:

1. In combination with a gas turbine power plant having means for sensing gas stream temperature and power plant speed, a fuel control having means for metering fuel flow to said power plant, means for selecting the gas stream temperature and the speed at which the power plant is to operate, means responsive to a function of gas stream temperature error and means responsive to a function of the rate of change with time of one of a group of power plant variables including speed and speed error for actuating said fuel flow metering means to vary the rate of change of fuel flow with time, and means biasing selected temperature from its equilibrium value as a function of power plant speed error.

2. In combination with a gas turbine power plant having means for sensing gas stream temperature and power plant speed, a fuel control having means for metering fuel flow to said power plant, means for selecting the gas stream temperature and the speed at which the power plant is to operate, means responsive to a function of gas stream temperature error and means responsive to a function of the rate of change of power plant speed error with time for actuating said fuel flow metering means to vary the rate of change of fuel flow with time, and means connecting said temperature error responsive means and said speed error responsive means for biasing selected temperature from its equilibrium value as a function of power plant speed error.

3. In combination with a gas turbine power plant having means for sensing gas stream temperature and power plant speed, a fuel control having means for metering fuel flow to said power plant, coordinated means for simultaneously selecting the gas stream temperature and the speed at which the power plant is to operate, means responsive to a function of the difference at any time between the selected gas stream temperature and actual gas stream temperature acting on said fuel flow metering means, means responsive to a function of the rate of change of the difference at any time between selected power plant speed and actual power plant speed also acting on said fuel flow metering means, said temperature difference means and said speed difference means varying the rate of change of fuel flow with time, and means connecting said temperature difference responsive means and said speed difference responsive means for biasing selected temperature from its equilibrium value as a function of power plant speed error.

4. In combination with a gas turbine power plant having means for sensing gas stream temperature and power plant speed, a fuel control having means for metering fuel flow to said power plant, manually operated means for selecting the gas stream temperature and the speed at which the power plant is to operate, means responsive to a function of the difference at any time between the selected gas stream temperature and actual gas stream temperature acting on said fuel flow metering means, means responsive to a function of the rate of change of the difference at any time between selected power plant speed and actual power plant speed also acting on said fuel flow metering means, said temperature difference means and said speed difference means varying the rate of change of fuel flow with time, and means connecting said temperature difference responsive means and said speed difference responsive means for biasing selected temperature from its equilibrium value as a function of power plant speed error within desired limits of maximum and minimum actual temperature.

5. For a gas turbine power plant, a fuel control in combination with a speed governor, means for the selection of gas stream temperature and power plant speed, said temperature being regulated by said fuel control and said speed being regulated by said governor, said fuel control including means for varying the rate of change of fuel flow with time to said power plant, means for sensing gas stream temperature and power plant speed, means controlled by said temperature and speed sensing means for regulating said fuel flow varying means as a function of gas stream temperature error and as a function of the rate of change of power plant speed error with time, and means connecting said temperature and speed sensing means for biasing selected temperature from its equilibrium value as a function of power plant speed error.

6. For a gas turbine power plant, a fuel control in combination with a constant speed governor, means for the selection of gas stream temperature and power plant speed, said temperature being regulated by said fuel control and said speed being regulated by said governor, said fuel control including metering means for varying the rate of change of fuel flow with time to said power plant, means for sensing gas stream temperature and power plant speed, means controlled by said temperature and speed sensing means for regulating said metering means as a function of gas stream temperature error and as a function of the rate of change of power plant speed error with time, means biasing selected temperature from its equilibrium value as a function of power plant speed error, and a regulating valve for controlling fuel pressure drop across said metering means.

7. For a gas turbine power plant, a fuel control in combination with a speed governor, means for the selection of gas stream temperature and power plant speed, said temperature being regulated by said fuel control and said speed being regulated by said governor, said fuel control including metering means for varying the rate of change of fuel flow with time to said power plant, means for sensing gas stream temperature and power plant speed, means controlled by said temperature and speed sensing means for regulating said fuel metering means as a function of gas stream temperature error and as a function of the rate of change of power plant speed error with time, means biasing selected temperature from its equilibrium value as a function of power plant speed error, a regulating valve for controlling fuel pressure drop across said metering means, and means controlling said regulating valve for limiting the maximum and minimum actual gas stream temperature.

8. For a gas turbine power plant, a fuel control in combination with a speed governor, means for the selection of gas stream temperature and power plant speed, said temperature being regulated by said fuel control and said speed being regulated by said governor, said fuel control including metering means for varying the rate of change of fuel flow with time to said power plant, means for sensing gas stream temperature and power plant speed, means controlled by said temperature and speed sensing means for regulating said fuel metering means as a function of gas stream temperature error and as a function of the rate of change of power plant speed error with time, means biasing selected temperature from its equilibrium value as a function of power plant speed error, a regulating valve for controlling fuel pressure drop across said metering means, and means controlling said regulating valve for limiting the speed range of said power plant.

9. For a gas turbine power plant, a fuel control in combination with a speed governor, means for the selection of gas stream temperature and power plant speed, said temperature being regulated by said fuel control and said speed being regulated by said governor, said fuel control including metering means for varying the rate of change of fuel flow with time to said power plant, means for sensing gas stream temperature and power plant speed, means controlled by said temperature and speed sensing means for regulating said fuel metering means as a function of gas stream temperature error and as a function of the rate of change of power plant speed error with time, means biasing selected temperature from its equilibrium value as a function of power plant speed error, a regulating valve for controlling fuel pressure drop across said metering means, and means controlling said metering means for limiting the maximum torque developed by said power plant.

10. For a gas turbine power plant, a fuel control in combination with a speed governor, means for the selection of gas stream temperature and power plant speed, said temperature being regulated by said fuel control and said speed being regulated by said governor, said fuel control including metering means for varying the rate of change of fuel flow with time to said power plant, means for sensing gas stream temperature and power plant speed, means controlled by said temperature and speed sensing means for regulating said fuel metering means as a function of gas stream temperature error and as a function of the rate of change of power plant speed error with time, means connecting said temperature and speed sensing means for biasing selected temperature from its equilibrium value as a function of power plant speed error, a regulating valve for controlling fuel pressure drop across said metering means and means controlling said regulating valve for limiting maximum and minimum actual gas stream temperature and power plant speed.

11. For a gas turbine power plant, a fuel control in combination with a speed governor, means for the selection of gas stream temperature and power plant speed, said temperature being regulated by said fuel control and said speed being regulated by said governor, said fuel control including a metering valve for varying the rate of change of fuel flow with time to said power plant, said metering valve comprising a piston member and a surrounding sleeve member axially slidable with respect to each other, means for sensing gas stream temperature and power plant speed, means controlled by said temperature sensing means for axially displacing one of said valve members as a function of gas stream temperature error, means controlled by said speed sensing means for axially displacing the other of said valve members as a function of the rate of change of power plant speed error with time, and means connecting said temperature and speed sensing means for biasing selected temperature from its equilibrium value as a function of power plant speed error.

12. For a gas turbine power plant, a fuel control in combination with a speed governor, means for the selection of gas stream temperature and power plant speed, said temperature being regulated by said fuel control and said speed being regulated by said governor, said fuel control including a metering valve for varying the rate of change of fuel flow with time to said power plant, said metering valve comprising a piston member and a surrounding sleeve member axially slidable with respect to each other, means for sensing gas stream temperature and power plant speed, means controlled by said temperature sensing means for axially displacing one of said valve members as a function of gas stream temperature error, means controlled by said speed sensing means for axially displacing the other of said valve members as a function of the rate of change of power plant speed error with time, means connecting said temperature and speed sensing means for biasing selected temperature from its equilibrium value as a function of power plant speed error, a regulating valve for controlling the pressure drop across said metering valve, and means controlling said regulating valve for limiting the maximum and minimum actual gas stream temperature.

13. For a gas turbine power plant, a fuel control in combination with a speed governor, means for the selection of gas stream temperature and power plant speed, said temperature being regulated by said fuel control and said speed being regulated by said governor, said fuel control including a metering valve for varying the rate of change of fuel flow with time to said power plant, said metering valve comprising a piston member and a surrounding sleeve member axially slidable with respect to each other, means for sensing gas stream temperature and power plant speed, means controlled by said temperature sensing means for axially displacing one of said valve members as a function of gas stream temperature error, means controlled by said speed sensing means for axially displacing the other of said valve members as a function of the rate of change of power plant speed error with time, means connecting said temperature and speed sensing means for biasing selected temperature from its equilibrium value as a function of power plant speed error, a regulating valve for controlling the pressure drop across said metering valve, means controlling said regulating valve for limiting the maximum and minimum gas stream temperature, and means also controlling said regulating valve for limiting the minimum speed at which said power plant will operate.

References Cited in the file of this patent

UNITED STATES PATENTS

| Number | Name | Date |
|---|---|---|
| 2,280,765 | Anxionnaz | Apr. 21, 1942 |
| 2,336,232 | Doran | Dec. 7, 1943 |
| 2,378,036 | Reggio | June 12, 1945 |
| 2,378,037 | Reggio | June 12, 1945 |
| 2,404,428 | Bradbury | July 23, 1946 |
| 2,407,115 | Udale | Sept. 3, 1946 |
| 2,422,808 | Stokes | June 24, 1947 |
| 2,457,595 | Orr | Dec. 28, 1948 |
| 2,475,156 | Schorn | July 5, 1949 |
| 2,485,431 | Chudyk | Oct. 18, 1949 |
| 2,489,586 | Ray | Nov. 29, 1949 |
| 2,498,939 | Bobier | Feb. 28, 1950 |
| 2,505,796 | Sédille | May 2, 1950 |
| 2,514,674 | Schorn | July 11, 1950 |

(Other references on following page)

UNITED STATES PATENTS

| | | | |
|---|---|---|---|
| 2,528,252 | Starkey | Oct. 31, | 1950 |
| 2,545,856 | Orr | Mar. 20, | 1951 |
| 2,560,118 | Malone et al. | July 10, | 1951 |
| 2,564,107 | Holley | Aug. 14, | 1951 |
| 2,568,127 | May et al. | Sept. 18, | 1951 |
| 2,606,420 | Moore | Aug. 12, | 1952 |
| 2,622,393 | Edwards et al. | Dec. 23, | 1952 |
| 2,631,677 | Kochenburger et al. | Mar. 17, | 1953 |
| 2,667,228 | Wood et al. | Jan. 26, | 1954 |
| 2,667,743 | Lee | Feb. 2, | 1954 |

FOREIGN PATENTS

| | | | |
|---|---|---|---|
| 614,202 | Great Britain | Dec. 10, | 1948 |